United States Patent [19]
Gibbons et al.

[11] Patent Number: 6,043,337
[45] Date of Patent: Mar. 28, 2000

[54] POLARIZABLE AMINES AND POLYIMIDES FOR OPTICAL ALIGNMENT OF LIQUID CRYSTALS

[75] Inventors: Wayne M. Gibbons, Bear, Del.; Paul J. Shannon, Exton, Pa.; Hanxing Zheng, Wilmington, Del.

[73] Assignee: Elsicon, Inc., Wilmington, Del.

[21] Appl. No.: 09/080,883

[22] Filed: May 18, 1998

Related U.S. Application Data

[63] Continuation-in-part of application No. 08/859,404, May 20, 1997.
[51] Int. Cl.⁷ .................................................. C08G 73/10
[52] U.S. Cl. ............................ 528/353; 428/1; 428/473.5
[58] Field of Search ................................ 528/353; 428/1, 428/473.5

*Primary Examiner*—Samuel Barts
*Attorney, Agent, or Firm*—Huntley & Associates

[57] ABSTRACT

The present invention relates to amine compositions and the preparation of polyimides. The polyimides can be used for inducing alignment of a liquid crystal medium with polarized light in liquid crystal display elements.

8 Claims, 3 Drawing Sheets

POLARIZABLE AMINES AND POLYIMIDES FOR OPTICAL ALIGNMENT OF LIQUID CRYSTALS

CROSS REFERENCE TO RELATED APPLICATION

This application is a Continuation-in-Part of U.S. Ser. application No. 08/859,404, filed May 20, 1997.

This invention was made with United States Government support under Agreement No. MDA972-93-2-0014 awarded by ARPA. The United States Government has certain rights in the invention.

BACKGROUND OF THE INVENTION

The present invention relates to compositions useful for inducing alignment of a liquid crystal medium with polarized light and liquid crystal display elements.

Most liquid crystal devices, including displays, have a finite pre-tilt angle, controlled, for instance, by the mechanical buffing of selected polymeric alignment layers. Liquid crystal molecules in contact with such a layer align parallel to the buffing direction, but not exactly parallel to the substrate. The liquid crystal molecules are slightly tilted from the substrate, for instance, by about 0.5–15°. For most display applications, a finite and uniform pre-tilt angle of the liquid crystal is desirable. For other display applications requiring predominately homeotropic alignment of liquid crystals, a much higher pre-tilt angle is desired, for instance, 85–89.9°. In these cases, controlling the pre-tilt by a mechanical rubbing process is very difficult.

A new process for aligning liquid crystals with polarized light was disclosed in U.S. Pat. No. 4,974,941 entitled "Process of Aligning and Realigning Liquid Crystal Media". Controlling the pre-tilt angle of liquid crystals in contact with optical alignment layers, while maintaining high uniformity of alignment, is an important requirement for optical alignment materials. Continuing effort has been directed to the development of compositions for optical alignment of liquid crystals and liquid crystal displays.

SUMMARY OF THE INVENTION

The present invention provides polarizable fluorinated amines of the general formula I $$P-L_f-A-(NH_2)_q \qquad I$$

wherein A is a divalent or trivalent organic moiety, $L_f$ is a divalent organic radical comprising at least four fluorinated carbon atoms; P is a polar group comprising a Pi electron system containing at least one heteroatom selected from the group N, O and S; and q is 1 to 2.

The invention also provides a polyamic acid composition which is the reaction product of an amine component and a tetracarboxylic dianhydride component which comprises at least one structural element of each of formulas IV and V

IV

-continued

V wherein $X_4$ is an electron withdrawing group having a positive σ, A is a trivalent organic moiety, P is a polar group comprising a Pi electron system containing at least one heteroatom selected from the group N, O, and S, and $L_f$ consists essentially of:

$$-X-(CH_2)_n-(CF_2)_p-(CH_2)_n-X-$$

wherein $-(CF_2)_p-$ is a straight chain or branched chain perfluoroalkyl radical, p is 4 to 20, X is selected from the group consisting of $-CH_2O-$, $-CH_2S-$, $-CH_2NR-$, $-O-$, $-S-$, $-NR-$ and a covalent bond, wherein R is a $C_1-C_4$ hydrocarbon, n is up to 4 and M is a tetravalent organic radical derived from said tetracarboxylic dianhydride containing at least two carbon atoms, no more than two carbonyl groups of the dianhydride being attached to any one carbon atom of the tetravalent radical.

The invention further provides polyimides derived from the polyamic acids and liquid crystal display elements made with the polyimide compositions.

DETAILED DESCRIPTION OF THE INVENTION

The polarizable amines of the present invention have been found to be particularly useful in the preparation of polyamic acids and the related polyimides. As used herein, as appropriate, the term "polyimide" also includes the corresponding precursor polyamic acid unless otherwise indicated. The polyimides, in turn, can be used to align liquid crystals. The polyimide compositions provide high uniformity of alignment and can induce a finite pre-tilt to liquid crystals that are optically aligned with polarized light.

The polarizable fluorinated amines of the present invention, when used in the optical alignment of a liquid crystal medium adjacent to a surface of an optical alignment layer, and particularly the polar group within these amines, provides controllable pre-tilt in the liquid crystal.

The polar group P can comprise a two atom system such as a carbonyl group; a three atom Pi system, for example, an enol ether, enamine, etc.; a four atom Pi system, for example an α, β-unsaturated nitrile, ketone, etc.; a five atom Pi system, for example, an α, β-unsaturated ester, an aromatic ring containing a heteroatom, for example, a pyridine, indole or benzofuran ring; an aromatic ring with a heteroatom linked through a covalent bond such as a phenoxy or anilino group, a 1,4-substituted phenylene Pi system wherein one or both substituents are heteroatoms; an aromatic ring conjugated to a two, three, four or five atom Pi system, for example, a cinnamate ester; or a 1,4-substituted phenylene Pi system wherein one of the substituents is a heteroatom and the other a two, three, four or five atom Pi system, for example a 4-aminobenzonitrile group.

Preferred polar P groups include photoactive groups that undergo a chemical change upon irradiation with light. Preferred P groups that are photoactive are diaryl ketone, cinnamate, stilbene, arylazo, aryl(diazo), aryl(triazo) and aryl(tetraazo) radicals.

Other preferred polar P groups include liquid crystal radicals comprising a diad, triad or tetraad liquid crystal radical. Examples include 4,4'substituted biphenyl. 4,4'substituted phenyl benzoate, 4,4'-substitute biphenyl benzoate and 4,4'substituted phenyl biphenylcarboxylate radicals.

Other preferred P groups include aromatic rings selected from the group wherein $X_3$ is selected from the group $-N(R_2)_2$, $-CN$, $-NO_2$, wherein $R_2$ is selected from the group consisting of H and $C_1-C_4$ hydrocarbon chains and t is up to 4.

Within the polarizable amines, diamines are preferred, that is, those compounds in which q is 2.

Preferable polarizable fluorinated amines of this invention are diamines of structure III:

III wherein Ar' is selected from the group:

wherein t is up to 4; X, n and p are as described below, and $X_3$ is selected from the group $-N(R_2)_2$, $-CN$, $-NO_2$, wherein $R_2$ is selected from the group consisting of H and $C_1-C_4$ hydrocarbon chain.

In the polarizable fluorinated amines, preferred are those in which $L_f$ is a moiety of the formula:

$-X-(CH_2)_n-(CF_2)_p-(CH_2)_n-X-$ wherein $-(CF_2)_p-$ is a straight chain or branched chain perfluoroalykyl radical, p is 4 to 20, X is selected from the group consisting of a covalent bond, $-CH_2O-$, $-CH_2S-$, $-CH_2NR-$, $-O-$, $-S-$ and $-NR-$, wherein R is a $C_1-C_4$ hydrocarbon, and n is up to 4. Of these, those in which X is $-O-$, p is 4 to 12 and n is 1 to 3 have been found to be particularly satisfactory, and are accordingly preferred. Also preferred are those amines in which A is an aromatic ring selected from the group consisting of:

Preferred polyamic acids and polyimides of the invention are the reaction product of at least one tetracarboxylic dianhydride at least one polarizable fluorinated diamine and at least one monoamine of the formula:

$X_1-(CF_2)_p-(CH_2)_n-X-Ar-NH_2$ wherein Ar is selected from the group and

X is selected from the group consisting of $-O-$, $-S-$ and $-NR-$ and a covalent bond, wherein R is a $C_1-C_4$ hydrocarbon, $X_1$ is selected from H and F, n is 0 to 4 and p is 6 to 20, wherein the monoamine comprises between 1 mol % and 5 mol % of the amine component and the polarizable fluorinated diamine comprises 2 mol % to 12 mol % of the amine component. Preferably, X is selected from the group $-O-$ and $-NR-$ and n is 1 to 4.

Preferred monoamines are those wherein Ar is phenyl, X is $-O-$; n is 1 to 2; p is 6 to 18 and $X_1$ is F. A specific monoamine that is most preferred is 4-(1H, 1H-dihydroperfluorooctyloxy)benzeneamine.

Generally, as described in Estes et al., U.S. Pat. No. 5,186,985, a monoamine would be used only as an end-capping entity, and therefore limit the length of the molecule. However, for use in optical alignment processes, lower molecular weight polymers offer the advantage of higher mobility. Thus, the probability of achieving a desired photochemical reaction upon irradiation with polarized light increases.

Synthesis of Monoamines

Monoamines are readily available by reduction of the corresponding nitro derivatives with tin (II) chloride or catalytic reduction with hydrogen and 5% palladium on carbon.

The nitro intermediates are readily available by nucleophilic displacement of 4-fluoronitrobenzene by a variety of monofunctional fluorinated alcohols and amines. Specific conditions for this reaction are outlined in the experimentals below. However, in general, a fluorinated alcohol or amine is stirred with the 4-fluoronitrobenzene in a polar aprotic solvent such as dimethylformamide, N-methylpyrrolidone or dimethylacetamide, in the presence of an organic or inorganic base such as triethylamine, potassium carbonate or potassium hydroxide. Usually, heating to 80° C. will facilitate the reaction.

Monofunctional fluorinated alcohols are commercially available. For instance, 1H,1H,5H-octafluoro-1-pentanol, 1H,1H,7H-perfluoro-1-heptanol, 1H,1H-perfluoro-1-octanol, 1H,1H,2H,2H-perfluoro-1-octanol, 1H,1H,2H,2H-perfluoro-1decanol1H,1H,2H,2H-perfluoro-1-dodecanol, 1H,1H2H,2H-perfluoro-9-methyl-1-deconal are available from PCR Inc., Gainesville, Fla. 32602 or Oakwood Products, Inc., West Columbia, S.C. 29169. Other monofunctional fluorinated alcohols are readily available by well known synthetic procedures. For instance, 1H,1H-perfluoro-1-tetradecanol, 1H,1H-perfluoro-1-dodecanol, 1H,1H-perfluoro-1-decanol, 1H,1H,-perfluoro-1-nonanol, 1H-1H, 9H-perfluoro-1-nonanol, 1H,1H-perfluoro-1-heptanol are available by reduction of the corresponding acids or acid chlorides with potassium borohydride according to the procedure of Bilibin, et al., in Macromol. Chem. Phys., 197, 1021–1029, (1966). Alternatively, a mixture of sodium borohydride and aluminum chloride can be used to accomplish the reduction to the alcohol. Other fluorinated alcohols are available by the known radical addition reaction of perfluoroiodides to ω-alkene-1-ols as described in Wang, et al., J. Polym. Prepr. (Am Chem. Soc., Div. Polym. Chem.), 37 #2, 815 (1996) or Hopken, et al., New Polym. Mater., 2, 339.

A monofunctional fluorinated amine commercially available is 1H,1H-perfluoro-1-octylamine. Other monofunctinal fluorinated amines are readily available by well known synthetic procedures. For instance, the ethyl esters of the fluorinated acids listed above are readily converted to amides by treatment with ammonia or primary amines. The amides can be readily reduced with diborane in tetrahydrofuran to produce primary and secondary amines. For instance, 1H,1H-perfluoro-1-tetradecylamine, 1H,1H-perfluoro-1-dodecylaminie, 1H,1H-perluoro-1-decylamine, 1H,1H,-perfluoro-1-nonylamine, 1H,1H,9H-perfluoro-1-nonylamine, 1H,1H-perfluoro-1-heptylamine are available by reduction of the corresponding primary amides. N-methyl-1,H1H-perfluoro-1-tetradecylamine, N-methyl-1H,1H-perfluoro-1-dodecylamine, N-methyl-1H,1H-perfluoro-1-decylamine, N-methyl-1H,1H,-perfluoro-1-nonylamine, N-methyl-1H,1H,9H-perfluoro-1-nonylamine, N-methyl-1H,1H-perfluoro-1-heptylamine are available by reduction of the corresponding N-methyl amides.

Figure 1:
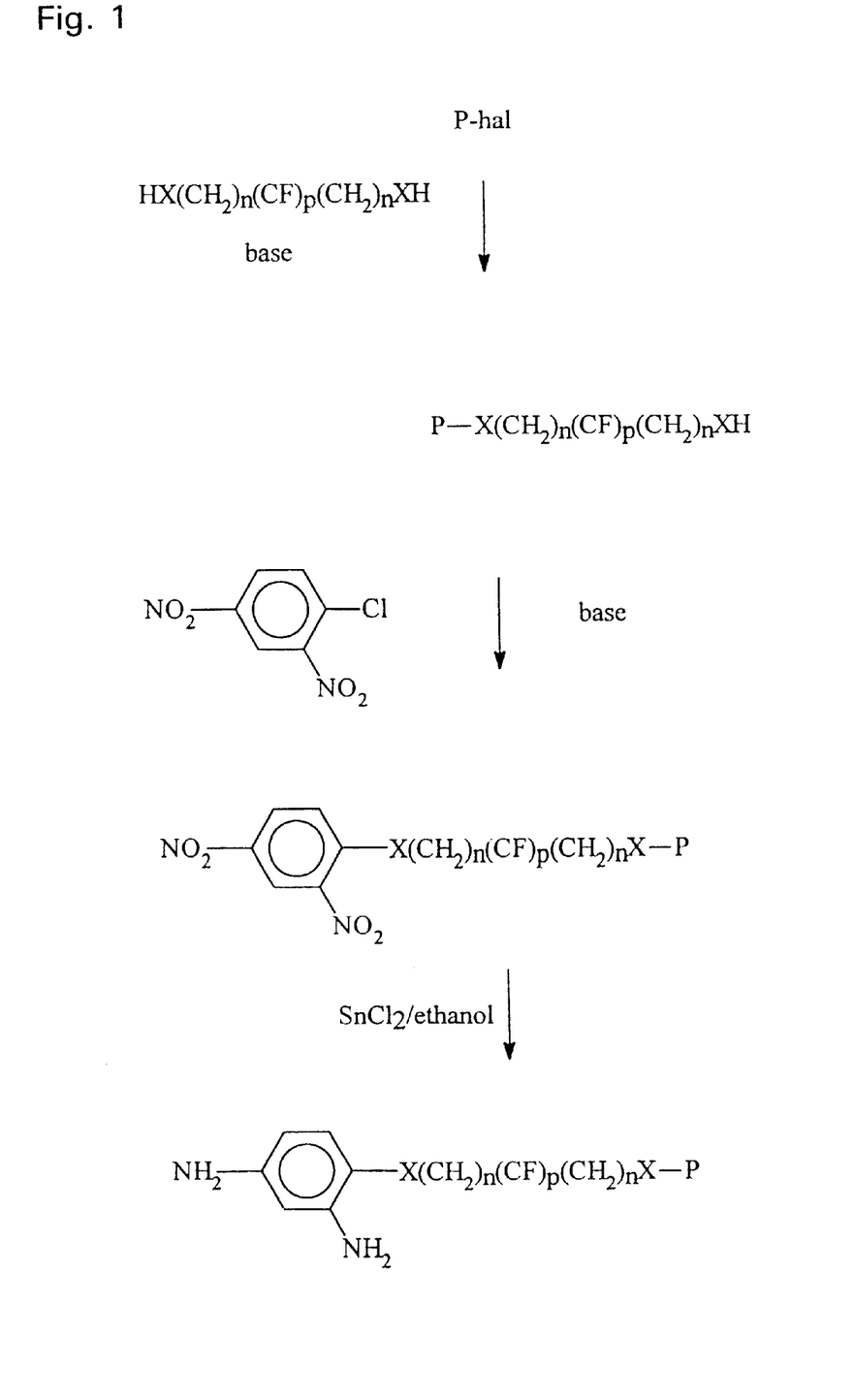
FIG. 1 is a summary of the synthesis of polarizable fluorinated amines.

Polarizable fluorinated amines of formula I can be readily prepared by the synthesis outlined in FIG. 1. Starting material which can be used is a fluorinated or partially fluorinated diol, diamine, dithiol, or a compound of mixed functionality, for instance, an aminoalcohol. The fluorinated difunctional compound is treated to react selectively at one site with the polar moiety, P, for instance, by nucleophilic displacement of a halogen from the polar moiety. Usually, a polar aprotic solvent such as dimethylformamide, N-methylpyrrolidone, methyl ethyl ketone, acetone, cyclopentanone, cyclohexanone or dimethylacetamide, in the presence of an organic or inorganic base such as triethylamine, potassium carbonate, sodium carbonate or potassium hydroxide is used in the first step. A large excess of the difunctional compound is usually used to insure formation of the desired monofunctional intermediate. Usually, heating to about 80° C. is sufficient to facilitate the reaction, but lower and higher temperatures can be used. The resulting monofunctional intermediate is then treated to react the second functional site, for instance by nucleophilic displacement of halogen from a 2,4-dinitrochlorobenzene. Usually, a polar aprotic solvent such as dimethylformamide, N-methylpyrrolidone, methyl ethyl ketone, acetone, cyclopentanone, cycloliexanone or dimethylacetamide, in the presence of an organic or inorganic base such as triethylamine, potassium carbonate, sodium carbonate or potassium hydroxide is used in the second step. Usually, heating to 80° C. is sufficient to facilitate the reaction, but lower and higher temperatures can be used. The nitro and dinitro analogs are then reduced with tin (II) chloride or catalytic reduction with hydrogen and 5% palladium on carbon. Specific reaction conditions for this reduction are described in the examples.

Starting materials for the synthesis of polarizable fluorinated amines are available commercially. For instance, commercially available difunctional fluorinated alcohols are 2,2,3,3,4,4,5,5-octafluoro-1,6-hexanediol, 3,3,4,4,5,5,6,6-octafluoro-8-octanediol and 1H,1H,10H,10H-hexadecafluoro-1,10-decanediol, available from Oakland proroducts, West Columbus, S.C. 29169. The corresponding diacids arc also commercially available. These diacids can be converted to N-methyl amides and reduced with diborane in tetrahydrofuran to produce N-methyl diamine derivatives. In this manner N,N'-(1dimethyl-2,2,3,3,4,4,5,5-octafluoro-1.6-hexanediamine, N,N '-dimethyl-3,3,4,4,5,5,6,6-octafluoro-1,8-octanediamine and in a similar manner N,N'-dimethyl-1H,1H,10H,10H-hexadecafluoro-1,10-decanediamine can prepared.

Other starting materials are available by synthesis. For instance, 3,3,4,4,5,5,6,6,7,7,8,8-dodecafluoro-1,10-decanediamine, 3,3,4,4,5,5,6,6-octafluoro-1,8-diamine, 3,3,4,4,5,5,6,6,7,7,8,9,9,9,10,10-hexadecafluoro-1,12-dodecanediamine are available from the corresponding azides using the procedures described by Malik, et al., Journal Organic Chemistry, 56, 3043 (1991).

Branched chain fluorinated starting materials are available by synthesis. Telomers of perfluoropropylene with α,ω-diiodoperfluoroalkanes are converted to branched-chain difunctional condensation monomers. Reaction of these telomers with ethylene give α,ω-diiodoethylperfluoroalkanes as described by Baum, et al., Journal Organic Chemistry, 59, 6804 (1994). Thus, available are 1,10-diiodo-1H,1H,2H,2H,11H,11H,12H,12H-perfluoro-3-methyldecane, 1,12-diiodo-1H, 1H,2H,2H,11H, 11H,12H,12H-perfluoro-3-methyldodecane and an isomeric mixture of 1,12-diiodo-1H,1H,2H,2H,11H,11H,12H,12H-perfluorodimethyldodecane. The iodo functional ends can be used directly in alkylation reactions similar to that described in Example 9. The diiodides can be converted to diols by reaction with fuming sulfuric acid. The diiodides can be converted to diamines by conversion to azides and reduction using conventional procedures as described by Baum et al. Thus, available are 1H,1H,2H,2H,11H,11H,12H,12H-perfluoro-3-methyl-1,12-dodecanediol, 1H,1H,2H,2H,11H, 11H,12H,12H-perfluoro-3-methyl-1,12-dodecanediamine, 1H,1H,2H,2H,11H,11H,12H,12H-perfluoro-3-methyl-1,12-decanediol, 1H,11H,2H,2H,11H,11H,12H,12H-perfluoro-3-methyl-1,12-decanediamine, and isomeric mixtures of 1H,1H,2H,2H,11H,11H,12H,12H-perfluorodimethyl-1,12-dodecanediol, 1H,1H,2H,2H,11H,11H,12H,12H-perfluorodimethyl-1,12-dodecanediamine.

The polarizable fluorinated amines can be a blend of monoamines and diamines. Preferably, the monoamine comprises between 1 mol % and 12 mol % of the amine component. Specific diamines of the present invention are illustrated in Table 1.

TABLE 1

Polarizable Fluorinated Diamines

1

2

3

4

5

6

7

8

9

TABLE 1-continued

Polarizable Fluorinated Diamines

The term "alignment layer" hereinafter refers to the layer of material on the surface of a substrate that controls the alignment of a liquid crystal layer in the absence of an external field. A "conventional alignment layer" hereinafter refers to an alignment layer that will only align a liquid crystal layer via processing other than optical means. For example, mechanically huffed polyimides, evaporated silicon dioxide, and Langmuir-Blodgett films, have all been shown to align liquid crystals.

"Optical alignment layer" hereinafter refers to an alignment layer that contains anisotropically absorbing molecules that will induce alignment of liquid crystals after exposure with polarized light. Optical alignment layers can be processed by conventional means, Such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between about 150 nm and about 2000 nm. The anisotropically absorbing molecules of the optical alignment layer can be covalently bonded within a main chain polymer, they can be covalently bonded as side groups to a main polymer chain, they can be present as nonbonded solutes in a polymer, or they can be in the adjacent liquid crystal layer as a solute and adsorbed oil the surface of a normal alignment layer to give an optical alignment layer.

Preferred optical alignment layers have absorbance maxima of about from 150 to 1600 nm. More preferable optical alignment layers have absorbance maxima of about from 150 nm to 800 nm. Most preferable optical alignment layers for the present invention have absorbance maxima of about from 150 and 400 nm and especially about from 300 to 400 nm.

Anisotropically absorbing molecules that can be used in optical alignment layers and various methods for forming optical alignment layers are discussed in U.S. Pat. No. 5,731,405 entitled "Process and Materials for Inducing Pre-tilt in Liquid Crystals and Liquid Crystal Displays," hereby incorporated by reference.

Polymers especially useful and preferred in the optical process of this invention are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall New York (1990). Typically polyimides are prepared by the condensation of one equivalent of a diamine with one equivalent of a dianhydride in a polar solvent to give a poly(amic acid) prepolymer intermediate.

The poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by addition of a dehydrating agent to form a polyimide polymer.

In preparing polyimides for optical alignment layers the molar ratio of diamine to dianhydride usually is 1:1, but can vary between 0.8:1 to 1:1.2. The preferred ratio of diamine to dianhydride is between 0.9:1 and 1:1.1.

The invention further embodies polyamic acids prepared from polarizable fluorinated amines of structure I and at least one tetracarboxylic dianhydride and the corresponding polyimides derived therefrom.

As the tetracarboxylic dianhydride component, diaryl ketone tetracarboxylic dianhydrides especially useful for the invention are those having the following structure:

II wherein $X_2$ is independently selected from the group H, Cl, F, Br, $R_1$, $R_1O$—, wherein $R_1$ is independently selected from $C_1$–$C_3$ perfluorinated alkyl chain, $C_1$–$C_3$ partially perfluorinated alkyl chain and $C_1$–$C_8$ hydrocarbon chain, m is 1 or 0; Z is selected from the group —S—, —O—, —SO$_2$—, —CH$_2$—, —C(CF$_3$)$_2$—, —C(O)—, —CH$_2$CH$_2$—, —NR— and a covalent bond wherein R is a $C_1$–$C_4$ hydrocarbon chain. The more preferred diaryl ketones are 3,3',4,4'-benzophenonetetracarboxylic dianhydride (BTDA) and 2,2'-dichloro-4,4'5,5'-benzophenonetetracarboxylic dianhydride. The most preferred benzophenone dianhydride for this invention is 3,3'4,4'-benzophenonetetracarboxylic dianhydride.

A wide variety of other dianhydrides can be used in forming polyimides useful in the invention. Specific examples of the tetracarboxylic dianhydride component include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2'3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane Other diaryl ketones dianhydrides that are useful in the process of the invention, wherein m is 1, are the polycyclic diaryl ketone dianhydrides described by Pfeifer, et al., in U.S. Pat. No. 4,698,295 and hereby incorporated by reference. Another diaryl ketone dianhydride that can be useful is 5,5'-[carbonylbis(4,1-phenyleneoxy)]bis-1,3-isobenzofuranone, Structure VI

VI

In one preferred embodiment the invention is a composition which is the reaction product of at least one diaryl ketone tetracarboxylic dianhydride, an amine component comprising at least two diamines, a polarizable fluorinated diamine and a second diamine, and at least one monoamine of the formula shown above.

Preferred are polyamic acids and polyimide compositions wherein the polarizable fluorinated diamine is of the formula III and more specifically, a polyimide composition wherein the diaryl ketone tetracarboxylic dianhydride of formula II is preferred.

A most preferred polyimide composition is that wherein the diaryl ketone tetracarboxylic dianhydride is 3,3',4,4'-benzophenonetetracarboxylic dianhydride; the polarizable fluorinated diamine is of formula III wherein Ar' is phenyl, t is 4, X is —O—, n is 1, p is 4, $X_3$ is selected from the group —N($R_2$)$_2$, —CN, and —NO$_2$ and wherein $R_2$ is selected from H and $C_1$–$C_4$ hydrocarbon chain; and the monoamine is 4-(1H,1H-dihydroperfluorooctyloxy)benzeneamine, wherein and the monoamine comprises 1 mol % to 5 mol % and the polarizable fluorinated diamine comprises 2 mol % to 12 mol % of the amine component.

Another embodiment of the present invention is a polyimide composition which is the reaction product of at least one tetracyclic dianhydride and an amine component comprising at least two diamines including a diaminobenzophenone and a polarizable fluorinated diamine of formula III, and at least one monoamine of the formula shown above, wherein and the monoamine comprises 1 mol % to 5 mol % and the polarizable fluorinated diamine comprises 2 mol % to 12 mol % of the amine component.

Alicyclic tetracarboxylic dianhydrides refer to dianhydrides that are comprised either partially or in whole of saturated carbocyclic rings. The alicyclic tetracarboxylic dianhydrides impart useful solubility properties to polyimides comprising them. Alicyclic tetracarboxylic dianhydrides suitable for the invention are 5-(2,5-dioxotetrahydro)-3-methyl-3-cyclohexene-1,2-dicarboxylic anhydride, commercially available from Chriskev, Inc., 2,3,5-tricarboxycyclopentaneacetic acid dianhydride available via synthesis by oxidation of dicyclopentadiene with nitric acid; 1,2,3,4-cyclohexanetetracarboxylic dianhydride, 1,2,3,4-butanetetracarboxylic dianhydride, and the like.

A preferred polyimide composition is that wherein the dianhydride component comprises a diaryl ketone tetracarboxylic dianhydride of formula II and an alicyclic tetracarboxylic dianhydride. More preferable is a polyimide wherein the alicyclic dianhydride is between 1–50 mol % of the dianhydride component. Most preferable is a polyimide wherein the alicyclic dianhydride is 5-(2,5-dioxotetrahydro)-3-methyl-3-cyclohexene-1,2-dicarboxylic anhydride.

A most preferred polyamic acid composition for optical alignment layers is the reaction product of an amine component and a tetracarboxylic dianhydride component which comprises at least two structural elements of the following formula

IV

V wherein $X_4$ is an electron withdrawing group having a positive σ, A is a trivalent organic moiety P is a polar group comprising a Pi electron system containing at least one heteroatom selected from the group N, O, and S, and $L_f$ consists essentially of:

wherein —($CF_2$)— is a straight chain or branched chain perfluoroalkyl radical, p is 4–20, X is selected from the group consisting of —$CH_2O$—, —$CH_2S$—, —$CH_2NR$—, —O—, —S—, —NR— and a covalent bond, wherein R is a $C_1$–$C_4$ hydrocarbon, n is up to 4; and M is a tetravalent organic radical derived from said tetracarboxylic dianhydride containing at least two carbon atoms, no more than two carbonyl groups of the dianhydride being attached to any one carbon atom of the tetravalent radical.

The propensity for an organic substituent to donate or withdraw electron density from a electronic system is described by the Hammett equation. J. March describes the Hammett equation in detail in "Advanced Organic Chemistry, Reactions, Mechanism, and Structure", McGraw-Hill, Publishers, New York 1977, p. 252–255. A positive value σ indicates an electron-withdrawing group and a negative value an electron-donating group. Preferred polyamic acid compositions for optical alignment materials have polyamic acid backbones wherein electron withdrawing groups in 2-substituted-1,4-benzenediamine moieties are present together with fluorinated polarizable diamines. The presence of both structural elements allows a balance to be achieved between high pre-tilt and high anchoring energy.

More preferred polyamic acids are wherein $X_4$ is selected from the group CN, —$CF_3$, F, Cl, Br, I, —$NO_2$, —$CO_2R_2$, and —$CON(R_2)_2$, wherein $R_2$ is H or a $C_1$–$C_4$ hydrocarbon; A is an aromatic ring selected from the group consisting of:

P is selected from the group of:

wherein X, is selected from the group —$N(R_2)_2$, —CN, —$NO_2$ and t is equal up to 4; within $L_f$, X is selected from —$CH_2O$— and —O—, p is 4–12 and n is 1 to 3; and M is wherein $X_2$ is independently selected from the group H, Cl, F, Br, $R_1$, $R_1O$—, wherein $R_1$ is independently selected from $C_1$–$C_3$ perfluorinated alkyl chain, $C_1$–$C_3$ partially perfluorinated alkyl chain and $C_1$–$C_8$ hydrocarbon chain, m is 1 or 0; Z is selected from the group —S—, —O—, —$SO_2$—, —$CH_2$—, —$C(CF_3)_2$—, —C(O)—, —$CH_2CH_2$—, —NR— and a covalent bond wherein R is a $C_1$–$C_4$ hydrocarbon chain; and the acid groups are ortho to the amide linkages.

Specific diamines useful in this invention are readily available from commercial sources. For instance, 2-(trifluoromethyl)-1,4-benzenediamine is available from PCR Inc. (P.O. Box 1466, Gainesville, Fla. 32602); 2,5-diaminobenzonitrile is available from Frinton Laboratories (P.O. Box 2428, Vineland, N.J. 08360); 2-nitro-1,4-phenylenediamine is available from Aldrich Chemical Co., 1001 West Saint Paul Ave., Milwaukee, Wis. 53233; 2-chloro-1,4-phenylene diamine is available from Chemetall Chemical Products Co., 50 Valley Rd., Berkley heights, N.J. 07922. Other useful diamines such as 2-fluoro-1,4-phenylene diamine, 2-bromo-1,4-phenylene diamine, methyl 2,5-diaminobenzoate, and 2,5-diaminobenzamide are available by synthesis.

To prepare the optical alignment layers of this invention, poly(amic acid) solutions or preimidized polyimide solutions are coated onto desired substrates. Coating is usually accomplished with about from 2 to 30 wt % solids. Any conventional method can be used to coat the substrates including brushing, spraying, spin-casting, dipping or printing. Tile coated substrates are typically heated in an oven under an inert atmosphere, for instance nitrogen or argon, at elevated temperature usually not exceeding 300° C. and preferably at or below 180° C. for about from 1 to 12 hours, preferably for about 2 hours or less. The heating process removes the solvent carrier and can be used to further cure the polymer. For instance, the poly(amic) acid films are thermally cured to generate polyimide films.

The optical alignment layers are exposed to polarized light to induce alignment of liquid crystals. By "polarized light" is meant light that is elliptically polarized such that the light is more polarized along one axis (referred to as the major axis) versus the orthogonal axis (referred to as the minor axis). The preferred polarization is linearly polarized light where the light is polarized mostly along one axis (the major axis) with little or no polarization component along the minor axis. In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps and black lights in combination with a polarizer. Polarizers useful in generating polarized light from nonpolarized light sources are interference polarizers made from dielectric stacks, absorptive polarizers and reflective polarizers based on Brewster reflection. With lower power lasers or when aligning small alignment regions, it can be necessary to focus the light beam onto the optical alignment layer.

By "exposing" is meant that polarized light is applied to the entire optical alignment layer or to a portion thereof. Tie light beam can be stationary or rotated. Exposures can be in one step, in bursts, in scanning mode or by other methods. Exposure times vary widely with the materials used, etc., and can range from less than 1 msec to over an hour. Exposure can be conducted before or after contacting the optical alignment layer with the liquid crystal medium. Exposing can be accomplished by linearly polarized light transmitted through at least one mask having a pattern or with a beam of linearly polarized light scanned in a pattern. Exposing also can be accomplished using interference of coherent optical beams forming patterns, i.e., alternating dark and bright lines.

Exposure energy requirements vary with the formulation and processing of the optical alignment layer prior and during exposure. For example, materials that possess high glass transition temperatures can have higher energy density requirements for optical alignment. Whereas, material systems designed to have a low glass transition temperature prior to exposure can have lower energy density requirements. A preferred range of exposure energy is about from 0.001 to 2000 J/cm². More preferred is the range of about from 0.001 to 100 J/cm² and most preferred range of exposure energy is about from 0.001 to 5 J/cm². Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, can be further impacted by heating, beyond that inherent in the "exposing" step. Additional heating during the exposing step can be accomplished by conduction, convection or radiant heating, or by exposure to unpolarized light. Additional heating can increase the mobility of the molecules during exposure and improve the alignment quality of the optical alignment layer. Additional heating is not a requirement of the process of the invention but can give beneficial results.

The quality of alignment and electrical properties of the liquid crystal cell assembled from exposed substrates can be improved by heating the substrates after exposure but prior to assembly of the cell. This additional heating of the substrates is not a requirement of the process but can give beneficial results.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:

(a) exposing at least one optical alignment layer to polarized light at a normal incidence, and (b) exposing the optical alignment layer to polarized light at an oblique incidence. Another preferred method of dual exposing comprises a two step process of:

(a) exposing said optical alignment layer to polarized light of a first direction of linear polarization of the incident light and (b) exposing said optical alignment layer to polarized light of a second direction of linear polarization of the incident light. Still another preferred method of dual exposing comprises a two step process of:

(a) exposing said optical alignment layer to polarized light of a first direction of linear polarization of the incident light, and (b) exposing said optical alignment layer to polarized light of a second direction of linear polarization of the incident light, at an oblique incidence. Yet another preferred method of dual exposing comprises a two step process of:

(a) exposing said optical alignment layer to polarized light of a first direction of linear polarization of the incident light at an oblique incidence, and (b) exposing said optical alignment layer to polarized light of a second direction of linear polarization of the incident light, at an oblique incidence.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include those described in U.S. Pat. No. 5,032,009 and new superfluorinated liquid crystals available from EM Industries, Hawthorne N.Y.

The exposed optical alignment layer induces alignment of a liquid crystal medium at an angle + and −θ with respect to the direction of the linear polarization of the incident light beam and along the plane of the optical alignment layer. One skilled in the art will recognize that the process of the instant invention allows control of the alignment of a liquid crystal medium in any desired direction within the plane of the optical alignment layer by controlling the conditions of the polarized light exposure. Preferrably the liquid crystal medium is aligned at an angle + and −θ, where θ is equal to about 90° to the polarization direction.

Figure 3:
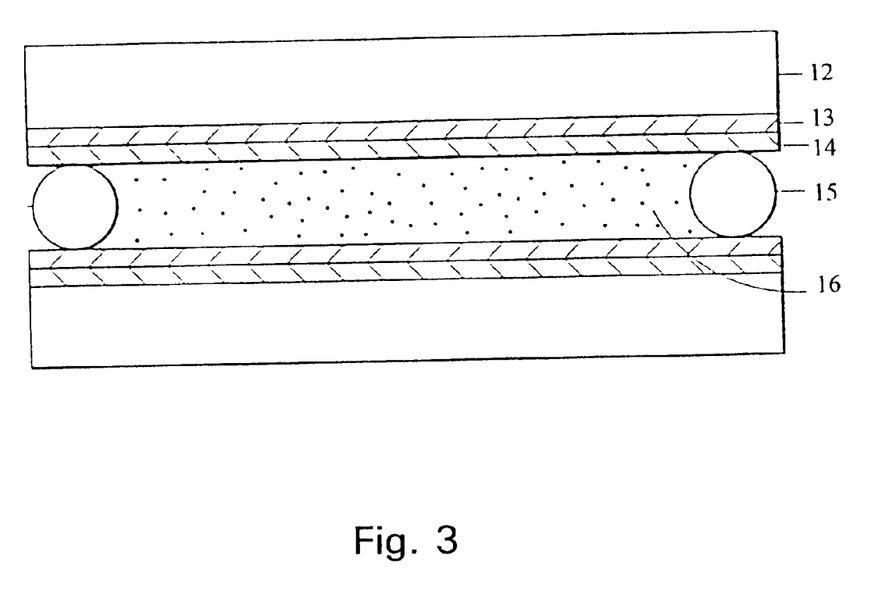
FIG. 3 illustrates the construction of a liquid crystal display element.

A liquid crystal display element made by the process of the instant invention is composed of an electrode substrate having at least one optical alignment layer, a voltage-impressing means and a liquid crystal material. FIG. 3 illustrates a typical liquid crystal display element, comprising a transparent electrode 13 of ITO (indium-tin oxide) or tin oxide on a substrate 12 and optical alignment layers 14 formed thereon. The optical alignment layers are exposed to polarized light of a wavelength or wavelengths within the absorption band of the anisotropically absorbing molecules. A spacer concurrently with a sealing resin 15 is intervened between a pair of optical alignment layers 14. A liquid crystal 16 is applied by capillary filling of the cell and the cell is sealed to construct a liquid crystal display element. Substrate 12 can comprise an overcoat film such as an insulating film, a color filter, a color filter overcoat, a laminated polarizing film etc. These coatings and films are all considered part of the substrate 12. Further, active elements such as thin film transistors, a nonlinear resistant element, etc. can also be formed on the substrate 12. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

The $L_f$ radical is derived from difunctional perfluorinated and partially fluorinated hydrocarbons.

1,16-Dibromo-5,5,6,6,7,7,8,8,9,9,10,10,11,11,12,12-hexadecafluorohexadecane is first prepared by the following procedure:

1,8-diiodoperfluorooctane (65.4 g, Fluorochem, Inc., Azusa, Calif. 91702), 3-buten-1-ol (14.4 g) and azoisobutylnitrile (AIBN, 0.3 g) is heated to 80° C. for 5 hrs. Tributyltin hydride (64.0 g) and additional ABIN (0.3 g) are added and heating is continued for 5 hr. 5,5,6,6,7,7,8,8,9,9,10,10,11,11,12,12-Hexadecafluoro-1,16-hexadecanediol is purified by kugelrohr distillation under reduced pressure.

5,5,6,6,7,7,8,8,9,9,10,10,11,11,12,12-Hexadecafluoro-1,16-hexadecanediol (27.3 g) and 48% aqueous hydrobromic acid is heated to 80° C. for 24 hrs. The mixture is diluted with water, extracted with ethyl ether, and washed several times with water. The extracts are dried ($MgSO_4$) and concentrated. The material is kugelrohr distilled under reduced pressure to give 1,16-dibromo-5,5,6,6,7,7,8,8,9,9,10,10,11,11,12,12-hexadecafluorohexadecane.

3,3,4,4,5,5,6,6,-octafluoro-1,8-octanediamine is first prepared by the procedures described by Malik et al., Journal Organic Chemistry, 56, 3043 (1991).

The examples of the invention use a fluorinated monoamine that was prepared by synthesis. 4-(1H,1H-perfluorooctyloxy)benzeneamine was made by the following procedure:

A mixture of 4-fluoronitrobenzene (141.1 g), 1H, 1H-perfluorooctanol (420.1 g), and potassium hydroxide (79.2 g) in 1-methyl-2-pyrrolidinone (1.0 L) was stirred at room temperature or 16 h under a nitrogen atmosphere. The mixture was extracted from aqueous Solution and concentrated to give 4-(1H,1H-perfluorooctyloxy)nitrobenzene which was recrystallized and reduced with hydrogen and 5% Pd/C. The Crude product was Kugelrohr distilled and recrystallized to give 4-(1H,1H-perfluorooctyloxy)benzeneamine as crystals, mp 49.1–50.2° C.

EXAMPLE 1

This example illustrates synthesis of a polarizable fluorinated diamine 1.

A mixture of 2,2,3,3,4,4,5,5-octafluoro-1,6-hexanediol (78.63 g, Aldrich Chemical Co., Milwaukee, Wis.), 1-fluoro-2,4-dinitrobenzene (18.6 g), triethyl amine (42 mL) and acetone (100 mL) was heated to 80° C. for 1.5 hr. After aqueous workup the excess hexanediol was removed by Kugelrohr distillation and the dimer by-product was removed by crystallization. The residual oil was treated with pentafluorobenzonitrile (19.3 g), triethyl amine (15.3 mL) and acetone (100 mL) and heated to reflux for 4 h. Aqueous workup followed by extraction gave 4-[6-(2,4-dinitrophenoxy)-2,2,3,3,4,4,5,5,-octaflurohexyloxy]-2,3,5,6-tetrafluorobenzonitrile as an orange oil.

The oil was reduced with tin chloride dihydrate (140.4 g), concentrated hydrochloric acid (97.5 mL,) and ethanol (300 mL) at 35–40° C. for 4.25 hr. Aqueous workup with potassium hydroxide (240 g) and extraction gave a crude diamine that was purified by repeated recrystallization to give diamine 1 (mp 97-98.2° C.).

EXAMPLE 2

This example illustrates synthesis of a polarizable fluorinated diamine 2.

A mixture of 2,2,3,3,4,4,5,5-octafluoro-1,6-hexanediol (15.7 g), 4-fluorobenzonitrile (2.42 g), potassium carbonate (1.36 g) and N-methylpyrrolidinone (50 mL) was heated to 80° C. for 18 hrs. The mixture was diluted with water and extracted with ether. The extracts were washed with water and brine, and dried ($MgSO_4$) and the excess diol removed by distillation. The pot residue was taken up in ethanol, cooled, and a by-product removed by filtration. The ethanol was removed to give a yellow solid (mp 95–97°C.).

The solid (5.1 g) was treated with 2,4-dinitrochlorobenzene (3.4 g), potassium carbonate (3.8 g) and NMP (20 mL) for about 24 hrs. at 72–76° C. The mixture was diluted with water, extracted with ethyl ether, washed with water and concentrated to give a yellow oil (8.3 g). Chromatography and recrystallization from ethanol gave 4-[6-(2,4-dinitrophenoxy)-2,2,3,3,4,4,5,5-octaflurohexyloxy]benzonitrile, 2.0 g, mp 89.0–90.6° C.

4-[6-(2,4-Dinitrophenoxy)-2,2,3,3,4,4,5,5-octaflurohexyloxy]benzonitrile (1.85 g) in ethanol (50 mL) was agitated with 5% palladium on carbon at 30 psi hydrogen atmosphere for 3 hrs. The solution was filtered through glass fiber mats and the ethanol removed. The red oil was purified by chromatography to give 0.30 g of diamine 2 as a colorless oil.

EXAMPLE 3

1H,1H,10H,10H-hexadecafluoro-1,10-decandediol (Oakland Products West Columbus, S.C. 29169) is processed as described in Example 1 to give the diamine 3.

EXAMPLE 4

3,3,4,4,5,5,6,6-octafluoro-1,8-octanediol (Oakland Products, West Columbus. S.C. 29169) is processed as described in Example 1 to give the diamine 4.

EXAMPLE 5

1-(6-hydroxy-2,2,3,3,4,4,5,5-octafluorohexyloxy)-2,4-dinitrobenzene (3.7 g) was treated with pentafluoronitrobenzene (2.21 g) and triethylamine (0.96 g) in NMP (5 mL) for 18 hrs at room temperature. The mixture was diluted with water, acidified with hydrochloric acid, and extracted with ethyl ether. The extracts were washed with water, dried (MgSO$_4$), concentrated and purified by chromatography to give 4-[6-(2,4-dinitrophenoxy)-2,2,3,3,4,4,5,5-octaflurohexyloxy]-2,3,5,6-tetrafluoronitrobenzene (5.0 g) as an oil.

4-[6-(2,4-Dinitrophenoxy)-2,2,3,3,4,4,5,5-octaflurohexyloxy]-2,3,5,6-tetrafluoronitrobenzene (5.0 g) was treated with tin chloride dihydrate as described in Example 1. Purification of the product by chromatography gave diamine 5 (1.2 g, mp at room temperature).

EXAMPLE 6

This example illustrates synthesis of a polarizable fluorinated diamine 6.

A mixture of 2,2,3,3,4,4,5,5-octafluoro-1,6-hexanediol (7.86 g) was treated with pentafluoronitrobenzene (2.13 g) and triethylamine (1.39 mL,) in NMP (15 mL) at room temperature for 1 hr. The mixture was diluted with water, acidified with acetic acid, and extracted with ethyl ether. The extract was washed with water and brine; dried (MgSO$_4$) and concentrated. Excess diol was removed by distillation and the residual oil purified by chromatography to give 4-(6-hydroxy-2,2,3,3,4,4,5,5-octafluorohexyloxy)tetrafluoronitrobenzene (3.06 g).

A solution of the 4-(6-hydroxy-2,2,3,3,4,4,5,5-octafluorohexyloxy)-2,3,5,6-tetrafluoronitrobenzene (2.0 g) in ethanol (50 mL) was treated with tin (II) chloride dihydrate (9.9 g) at 60° C. for 18 hrs. under a nitrogen atmosphere. The mixture was diluted with ice water, basified with potassium hydroxide (10.1 g) in water (80 mL) and extracted with ethyl ether. The extracts were washed with water and brine, dried (K$_2$CO$_3$), and concentrated to an oil. The oil was purified by chromatography to give 4-(6-Hydroxy-2,2,3,3,4,4,5,5-octafluorohexyloxy)-2,3,5,6-tetrafluorobenzeneamine as an oil (1.77 g).

The 4-(6-hydroxy-2,2,3,3,4,4,5,5-octafluorohexyloxy)-2,3,5,6-tetrafluorobenzeneamine (0.70 g) was treated with methyl iodide (0.41 mL) in NMP (4 mL) and sodium bicarbonate (0.27 g) at 50° C. followed by further addition of methyl iodide (0.41 mL portions) after 2, 18 and 20 hrs. At 22 hrs. the mixture was diluted with water and extracted with ethyl ether. The extracts were washed with water and brine, dried (K$_2$CO$_3$), and concentrated to the dimethylamino derivative as an oil (0.76 g).

N,N-Dimethyl-4-(6-hydroxy-2,2,3,3,4,4,5,5-octafluorohexyloxy)-2,3,5,6-tetrafluorobenzeneamine (1.05 g) was treated with 1-chloro-2,4-dinitrobenzene (0.51 g) and potassium carbonate (0.35 g) in NMP (5 mL) at 80° C. for 21.5 hrs. The mixture was diluted with water and extracted with ethyl ether. The extracts were washed with water and brine, dried (K$_2$CO$_3$), and concentrated to an orange oil. The oil was purified by chromatography to give N,N-dimethyl-4-[6-(2,4dinitrophenoxy)-2,2,3,3,4,4,5,5-octaflurohexyloxy]-2,3,5,6-tetrafluorobenzeneamine (1.05 g) as an oil.

The dinitro compound was reduced with tin chloride dihydrate as described above and the resulting oil purified by chromatography and recrystallization to give the diamine 6 (0.07 g, mp 52.0–53.2° C.).

EXAMPLE 7

This example illustrates formation of a polarizable fluorinated diamine 7.

A mixture of 2,2,3,3,4,4,5,5-octafluoro-1,6-hexanediol (7.86 g), 4-fluoroacetophenone (1.36 g), NMP (10 mL), and potassium carbonate (4.14 g) is heated to 95–100° C. for 48 hrs. The mixture is further processed as described in Example 1 to provide 4-(6-hydroxy-2,2,3,3,4,4,5,5-octafluorohexyloxy)acetophenone.

4-(6-hydroxy-2,2,3,3,4,4,5,5-octafluorohexyloxy)acetophenone (3.78 g), 2,4-dinitrochlorobenzene (2.42 g) potassium carbonate (2.76 g) and NMP (15 mL) are heated to 75–80° C. for 24 hrs. The solution is further processed as described in Example 2 to give 4-[6-(2,4-dinitrophenoxy)-2,2,3,3,4,4,5,5-octaflurohexyloxy]acetophenone.

4-[6-(2,4-Dinitrophenoxy)-2,2,3,3,4,4,5,5-octaflurohexyloxy]acetophenone (6.44 g) and sodium hydroxide solution (20 g 20 wt %) is treated with sodium hypochlorite (56 mL, 5.25 wt % solution) in 1,2-dimethoxyethane (200 mL) at 50–60° C. until the acetophenone disappears as indicated by monitoring with thin layer chromatography. Heating is continued for 2 hrs and the solvent is removed under reduced pressure. The mixture is diluted with water and excess hypochlorite neutralized with sodium bisulfite. The solution is acidified with hydrochloric acid and extracted with ethyl ether. The extracts are washed with brine, dried (MgSO$_4$) and concentrated give 4-[6-(2,4-dinitrophenoxy)-2,2,3,3,4,4,5,5-octaflurohexyloxy]benzoic acid.

4-[6-(2,4-Dinitrophenoxy)-2,2,3,3,4,4,5,5-octaflurohexyloxy]benzoic acid (6.46 g), toluene (30 mL), oxalyl chloride (2.0 g) and 1 drop of anhydrous dimethyl formamide is stirred for 16 hrs. at room temperature under a nitrogen atmosphere. Excess oxalyl chloride and toluene (10 mL) is removed by reduced pressure distillation. The remaining acid chloride solution is added to a solution of 4-cyanophenol (1.31 g), toluene (20 mL,) and triethylamine (1.5 g) and the mixture is stirred 24 hrs. at 50–60° C. under a nitrogen atmosphere. The solution is diluted with water, slightly acidified with hydrochloric acid, and extracted with toluene-ethyl ether. The extracts are washed with water and brine, dried (MgSO$_4$), concentrated, and purified by chromatography to give the 4-cyanophenyl 4-[6-(2,4-dinitrophenoxy)-2,2,3,3,4,4,5,5-octaflurohexyloxy]benzoate.

4-Cyanophenyl 4-[6-(2,4-dinitrophenoxy)-2,2,3 ,3,4,4,5,5-octaflurohexyloxy]benzoate (7.63 g), in ethanol (100 mL) is agitated with 5% palladium on carbon (0.8 g) at 40 psi hydrogen atmosphere for 8 hrs. The solution is filtered through glass fiber mats and the ethanol removed. The product is purified by chromatography to give the diamine 7.

EXAMPLE 8

This example illustrates formation of polarizable fluorinated diamine 8.

1H,1H,10H,10H-Hexadecafluoro-1,10-decandediol (13.86 g), 4-fluorobenzophenone (2.0 g), potassium carbonate (4.14 g) and NMP (10 mL) is heated to 95–100° C. for 48 hrs. The mixture is further processed as described in Example 1 to provide 4-(10-hydroxy-2,2,3,3,4,4,5,5,6,6,7,7,8,8,9,9-hexadecafluorodecyloxy)benzophenone.

A solution of 4-(10-Hydroxy-2,2,3,3,4,4,5,5,6,6,7,7,8,8,9,9-hexadecafluorodecyloxy)benzophenone (6.42 g), 2,4-dinitrochlorobenzene (2.42 g) potassium carbonate (2.76 g) and NMP (15 mL) is heated to 75–80° C. for 24 hrs. The solution is further processed as described in Example 2 to give 4-[10-(2,4-dinitrophenoxy)- 2,2,3,3,4,4,5,5,6,6,7,7,8,8, 9,9-hexadecafluorodecyloxy]benzophenone.

4-[10-(2,4-Dinitrophenoxy)-2,2,3,3,4,4,5,5,6,6,7,7,8,8,9, 9-hexadecafluorodecyloxy]benzophenone (8.08 g) is treated with tin (II) chloride dihydrate as described in Example 1 and purified by chromatography to give diamine 8.

EXAMPLE 9

This example illustrates formation of polarizable fluorinated diamine 9.

A solution of 1,16-dibromo-5,5,6,6,7,7,8,8,9,9,10,10,11, 11,12,12-hexadecafluorohexadecane (20.16 g), 4'-hydroxy-4-cyanobiphenyl (2.05 g), potassium carbonate (2.07 g) and acetone (30 mL) is refluxed for 8 hrs. The acetone is removed under reduced pressure and the residue diluted with water and extracted with ethyl ether. The extracts are washed with water and brine, dried ($MgSO_4$), concentrated, and purified by chromatography to give 4'-(16-bromo-5,5,6,6,7, 7,8,8,9,9,10,10,11,11,12,12-hexadecafluorohexadecyloxy)-4-cyanobiphenyl.

4'-(16Bromo-,5,5,6,6,7,7,8,8,9,9,10,10,11,11,12,12-hexadecafluorohexadecyloxy)-4-cyanobiphenyl (7.96 g), 2,4-dinitrophenol (2.21 g), potassium carbonate (1.65 g) and NMP (10 mL) is heated to 80–85° C. under a nitrogen atmosphere for 18 hrs. The solution is diluted with water and extracted with ethyl ether. The extracts are washed with water and brine, dried ($MgSO_4$), concentrated, and purified by chromatography to give 4'-[16-(2,4-dinitrophenoxy)-5,5, 6,6,7,7,8,8,9,9,10,10,11,11,12,12-hexadecafluorohexadecyloxy)-4-cyanobiphenyl.

The above dintiro compound (8.99 g) is reduced with palladium on carbon as described in Example 7 to give diamine 9.

EXAMPLE 10

This example illustrates formation of polarizable fluorinated diamine 10.

A mixture of 2,2,3,3,4,4,5,5-octafluoro-1,6-hexanediol (7.86 g), 4-fluorobenzaldehyde (1.24 g), NMP (10 mL), and potassium carbonate (4.14 g) was heated to 95–100° C. for 48 hrs. The mixture was further processed as described in Example 1 to provide 4-(6-hydroxy-2,2,3,3,4,4,5,5-octafluorohexyloxy)benzaldehyde.

4-(6-hydroxy-2,2,3,3,4,4,5,5-octafluorohexyloxy) benzaldehyde (3.66 g) 2,4-dinitrochlorobenzene (2.42 g) potassium carbonate (2.76 g) and NMP (15 mL) are heated to 75–80° C. for 24 hrs. The solution is further processed as described in example 2 to give 4-[6-(2,4-dinitrophenoxy)-2,2,3,3,4,4,5,5-octaflurohexyloxy]benzaldehyde.

To a mixture of trimethylsilyl diethylphosphonoacetate (2.97 g) in anhydrous tetrahydrofuran (100 mL) at 0°° C. is added 1.6 M solution of butyllithium in hexane (6.9 mL). The reaction is stirred for 2 hrs. at room temperature and then treated with 4-[6-(2,4-dinitrophenoxy)-2,2,3,3,4,4,5,5-octaflurohexyloxy]benzaldehyde (5.32 g) in anhydrous tetrahydrofuran (30 mL). The mixture is stirred for a further 2 hrs., diluted with water and extracted with ethyl ether. The extracts are wished with water and brine, dried ($MgSO_4$), concentrated, and purified by crystallization to give 4-[6-(2, 4-dinitrophenoxy)-2,2,3,3,4,4,5,5-octaflurohexyloxy] cinnamic acid. The acid is converted to the methyl ester by treatment with diazomethane in ether solution.

The resulting dinitro methyl cinnamate ester (6.04 g) is reduced with tin (II) chloride as described in Example 7 and is purified by chromatography to give diamine 10.

EXAMPLE 11

This example illustrates formation of polarizable fluorinated diamine 11.

1H,1H,10H,10H-Hexadecafluoro-1,10-decandediol (13.86 g), 2,3,4,5,6-pentafluorobenzophenone (2.72 g), potassium carbonate (4.14 g) and NMP (10 mL) is heated to 80° C. until the starting benzophenone dissipates by TLC analysis. The mixture is further processed as described in Example 1 to provide 4-(10-hydroxy-2,2,3,3,4,4,5,5,6,6,7, 7,8,8,9,9-hexadecafluorodecyloxy)-2,3,4,5,6, -pentafluorobenzophenone.

A solution of 4-(10-Hydroxy-2,2,3,3,4,4,5,5,6,6,7,7,8,8,9, 9-hexadecafluorodecyloxy)-2,3,4,5,6-pentafluorobenzophenone(7.14 g), 2,4dinitrochlorobenzene (2.42 g) potassium carbonate (2.76 g) and NMP (15 mL) is heated to 75–80° C. for 24 hrs. The solution is further processed as described in example 2 to give 4-[10-(2,4-dinitrophenoxy)-2,2,3,3,4,4,5,5,6,6,7,7,8,8,9,9-hexadecafluorodecyloxy]-1,2,3,4,5,6-pentafluorobenzophenone.

4-[10-(2,4-Dinitrophenoxy)-2,2,3,3,4,4,5,5,6,6,7,7,8,8,9, 9-hexadecafluorodecyloxy]-2,3,4,5,6-pentafluorobenzophenone (8.90 g) is treated with tin (II) chloride dihydrate as described in Example 1 and purified by chromatography to give diamine 11.

EXAMPLE 12

A mixture of 3,3,4,4,5,5,6,6,-octafluoro-1,8-octanediamine (8.6 g), 1-chloro-2,4-dinitrobenzene (2.0 g 10 mmol), potassium carbonate (1.36 g, 10 mmol) and N-methylpyrrolidone (5mL, NMP) is heated to 80° C. for 20 hrs. The mixture is diluted with water and extracted with ether. The extracts are washed with water, concentrated and the excess octanediamine removed by Kugelrohr distillation.

The residue is treated with pentafluorobenzonitrile (1.91 g, 10 mmol), triethyl amine (1.0 g, 10 mmol) and NMP (50 mL) at room temperature for 75 minutes. The mixture is diluted with water and extracted with ethyl ethertetrahydrofuran (4:1 ). The extracts are washed with water, dried ($K_2CO_3$) and concentrated. The resulting material is chromatographed to give 4-[6-(2,4-dinitroanilino-3,3,4,4,5,5,6, 6,-octafluoroctylamino]-2,3,5,6-tetrafluorobenzonitrile.

The benzonitrile is treated with tin chloride dihydrate (16.9 g, 75 mmol) and ethanol (100 mL) at 35° C. for 24 hrs. The mixture is poured into ice water, basified with potassium hydroxide (12.6 g), and extracted with ethyl ethertetrahydrofuran (3:1). The extracts are washed with water and brine, dried ($MgSO_4$) and concentrated. The material is chromatographed and recrystallized to give diamine 12.

EXAMPLE 13

This example illustrates the use of diamine 1 in a poly (amic acid) formulation and the use of the poly(amic acid) to prepare a polyimide optical alignment layer for alignment of liquid crystals.

To a solution of 2-(trifluoromethyl)-1,4-benzenediamine (82.5 mg) and diamine 1 (13.5 mg) in γ-butyrolactone (1.24 g) was added 3,3',4,4'-benzophenonetetracarboxylic dianhydride (161.1 mg) at room temperature under a nitrogen atmosphere. The mixture was stirred for 0.5 hr and 4-(1H, 1H-dihydroperfluorooctyloxy)benzeneamine (6.1 mg) was added followed by stirring for 23 hrs. at room temperature. The mixture was diluted with γ-butyrolactone (3.76 g) before spinning optical alignment layers.

Two 0.9 inch by 1.2 inch by 1 millimeter thick borosilicate glass substrates with transparent indium-tin-oxide (ITO) electrode coatings (Donnelly Corp., Holland, Mich.) were spin-coated and cured with the polyimide formulation to give optical alignment layers. Spin coating was achieved by filtering the prepolymer solution through a 0.45mm Teflon filter membrane directly onto the surface of the clean ITO glass substrates. The coated ITO glass substrates were then spun at 2500 RPM for 1 minute to produce uniform thin films. The resultant thin films were cured under nitrogen for 0.25 hrs. at 80° C. followed by 1 hr. at 180° C.

Figure 2:
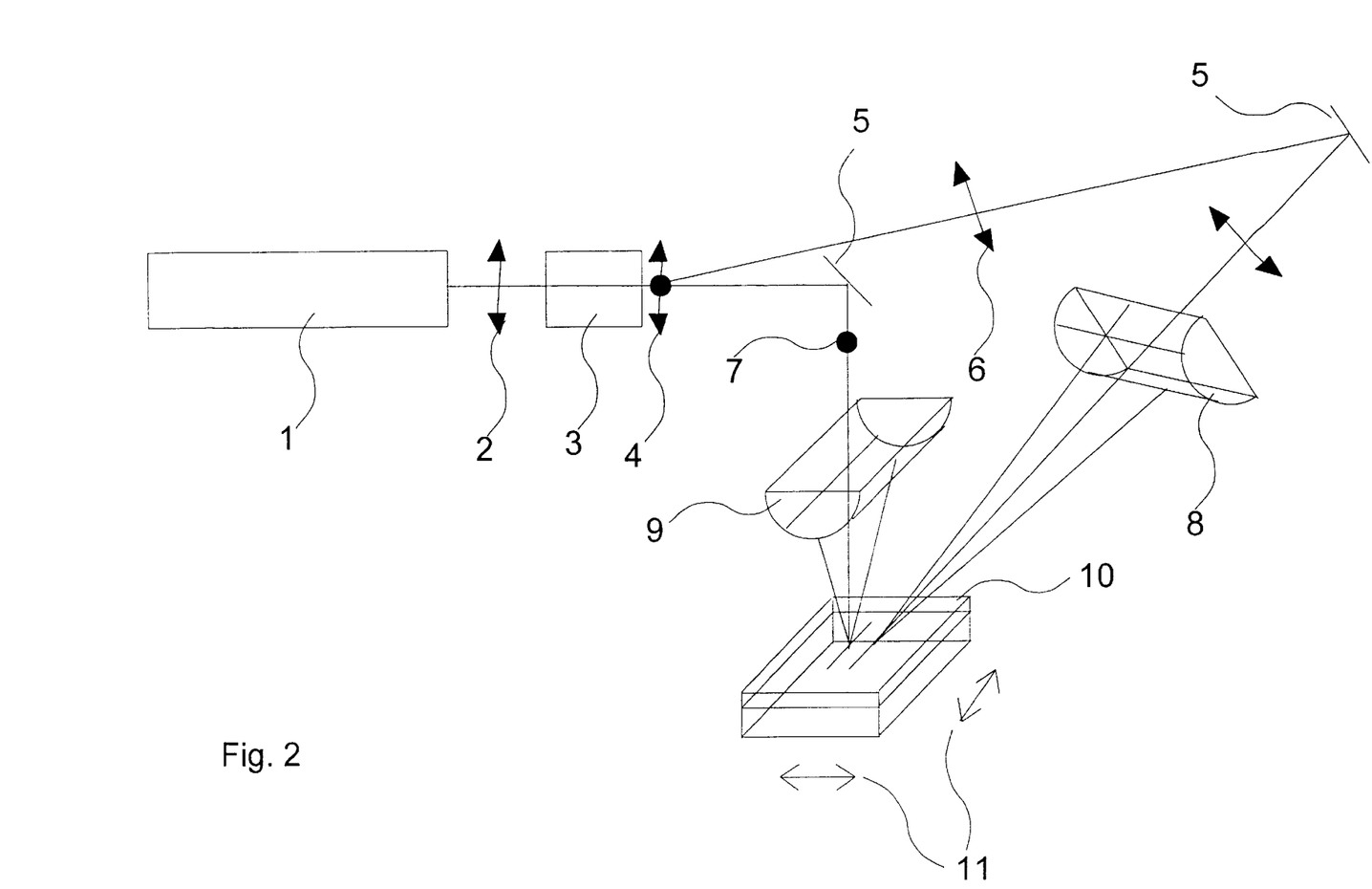
FIG. 2 illustrates the experimental setup for exposing substrates to polarized UV light.

FIG. 2 is a schematic of the experimental set-up used to expose the substrates. A laser beam of about 1 cm in diameter from laser 1, polarized along direction 2, entered a polarizing rotator and beam splitter combination 3 and, upon exiting, two polarization components 6 and 7 separated as they propagated away from 3. The wavelength range of the laser was 300–336 nm. By adjusting the polarizing rotator in 3, the ratio of optical power in 6 and 7 can be adjusted and, in this case, the ratio was adjusted to be 1:6. The total power in 6 and 7 was 500 mW. Mirrors 5 reflected 6 and 7 through cylindrical lenses 8 and 9 with focal lengths of 5 cm and 10 cm, respectively. After passing through cylindrical lenses 8 and 9, 6 and 7 were focused into lines of about 1 cm×0.2 cm onto the substrate(s) 10. The separation between the two parallel focused lines was about 1.5 mm. As depicted in FIG. 2, the substrates 10 were scanned perpendicular to the focused lines. Since the focused line lengths of about 1 cm was smaller than the desired exposure area, after scanning one time, the substrates were stepped 1.5 mm perpendicular to the scan direction (along the focused lines). The step and scan 11 were repeated until the entire substrate area was exposed. The scan speed for this exposure was 0.75 mm/s.

A twisted nematic liquid crystal cell was constructed from the two exposed coated substrates. Four micron spacers were mixed in with an epoxy and the epoxy mixture was placed at the edges of the coated side on one exposed substrate. The second exposed substrate was placed oil top of the first substrate such that the alignment layers were facing each other and the respective background alignment directions were perpendicular to each other. The substrates were pressed to a four micrometer spacing using clamps and the fiber spacer/epoxy mixture was allowed to cure. Two spaces on opposite sides of the cell were left unsealed so that the liquid crystal would fill the cell along the bisector between the alignment directions of the substrates. The cell was placed in a vacuum and, subsequently, one unsealed opening on the cell was dipped into a nematic liquid crystal doped with chiral compound. After filling, the cell was removed from the liquid crystal and vacuum, cleaned up, and the spaces sealed with epoxy. The cell was subsequently heated above the nematic-isotropic transition of the liquid crystal to remove any defects introduced during filling.

The cell was viewed between parallel and crossed polarizers on a photographic light box. For the two polarizer configurations, the transmission of the cell was consistent with a twisted nematic orientation of the liquid crystal and the cell gave a net uniform twisted nematic alignment. The pre-tilt angle was measured using the crystal rotation method to be approximately 1°.

EXAMPLE 14

This example further illustrates the use of diamine 1 in a poly(amic acid) formulation and the use of the poly(amic acid) to prepare a polyimide optical alignment layer for alignment of liquid crystals.

A mixture of 3,3',4,4'-benzophenonetetracarboxylic dianhydride (70.9 g), 2-(trifluoromethyl)-1,4-benzenediamine (34.86 g), diamine 1 (5.95 g), 4-(1H,1H-perfluorooctyloxy) benzeneamine (5.40 g) and γ-butyrolactone (470 g) was stirred at room temperature for 24 h under a nitrogen atmosphere. The solution was diluted to a 10 wt % solution with γ-butyrolactone (585.0 g) and filtered through a 0.45 micron teflon membrane filter and stored in a refrigerator under nitrogen until used.

The substrates were coated, processed and exposed as described in Example 13 and the exposure conditions were adjusted accordingly for this formulation. The pre-tilt was measured to be approximately 2°.

EXAMPLE 15

This example further illustrates the use of diamine 1 in a poly(amic acid) formulation and the use of the poly(amic acid) to prepare a polyimide optical alignment layer for alignment of liquid crystals.

To a solution of 2-(trifluoromethyl)-1,4-benzenediamine (164.2 mg), 4-1H,1H-perfluorooctyloxy)benzeneamine (17.2 mg) and diamine 1 (27.1 mg) in γ-butyrolactone (1.79 g) was added 3,3',4,4'-benzophenonetetracarboxylic dianhydride (290.0 mg) and 5-(2,5-dioxotetrahydro)-3-methyl-3-cyclohexene-1,2-dicarboxylic anhydride (26.4 mg) followed by stirring for 23 hr at room temperature. The mixture was diluted with γ-butyrolactone (8.17 g) before spinning optical alignment layers.

The substrates were coated and processed as described in Example 13, the exposure conditions were adjusted accordingly for this formulation. The results were the same as Example 13 except that the pre-tilt was measured to be approximately 2°.

EXAMPLE 16

This example further illustrates the use of diamine 1 in a poly(amic acid) formulation and the use of the poly(amic acid) to prepare a polyimide optical alignment layer for alignment ol liquid crystals.

To a solution of 2-(trifluoromethyl)-1,4-benzenediamine (73.7 mg), 4-(1H,1H-perfluorooctyloxy)benzeneamine (6,1 mg) 4,4'diaminobenzophenone (10.6 mg) and diamine 1 (13.5 mg) in γ-butyrolactone (1.02 g) was added 3,3',4,4'-benzophenonetetracarboxylic dianhydride (145.0 mg) and 5-(2,5-dioxotetrahydro)-3-methyl-3-cyclohexene-1,2-dicarboxylic anhydride (13.2 mg) followed by stirring for 23 hrs. at room temperature. The mixture was diluted with -butyrolactone (3.96 g) before spinning optical alignment layers.

The substrates were coated and processed as described in Example 13, the exposure conditions were adjusted accordingly for this formulation. The results were the same as Example 13 except that the pre-tilt was measured to be approximately 2°.

EXAMPLE 17

This example illustrates the use of diamine 5 in a poly (amic acid) formulation and the use of this poly(amic acid) to prepare a polyimide optical alignment layer for alignment of liquid crystals.

To a solution of 2-(trifluoromethyl)-1,4-benzenediamine (83.6 mg) and diamine 5 (13.3 mg) in γ-butyrolactone (1.80 g) was added 3,3',4,4'-benzophenonetetracarboxylic dianhydride (161.1 mg) at room temperature under a nitrogen atmosphere and the solution was stirred for 23 hrs. at room temperature. The mixture was diluted with γ-butyrolactone (3.10 g) before spinning optical alignment layers.

The substrates were coated and processed as described in Example 13, the exposure conditions were adjusted accordingly for this formulation. The results were the same as Example 13 except that the pre-tilt was measured to be approximately 0°. The cell showed very good uniformity of alignment.

EXAMPLE 18

This example illustrates the use of diamine 6 in a poly(amic acid) formulation and the use of the poly(amic acid) to prepare a polyimide optical alignment layer for alignment of liquid crystals.

To a solution of 2-(trifluoromethyl)-1,4-benzenediamine (83.6 mg) and diamine 6 (14.0 mg) in γ-butyrolactone (1.30 g) was added 3,3',4,4'-benzophenonetetracarboxylic dianhydride (161.1 mg) at room temperature under a nitrogen atmosphere and the solution was stirred for 23 hrs. at room temperature. The mixture was diluted with γ-butyrolactone (3.62 g) before spinning optical alignment layers.

The substrates were coated and processed as described in Example 13, the exposure conditions were adjusted accordingly for this formulation. The results were the same as Example 13 except that the pre-tilt was measured to be approximately 0°. The cell showed very good uniformity of alignment.

EXAMPLE 19

A mixture of 2,2,3,3,4,4,5,5-octafluoro-1,6-hexanediol (39.25 g), 3,5-dinitrobenzyl chloride (10.8 g), potassium carbonate (20.7 g) and NMP (50 mL) was stirred at room temperature for 17 hr. After aqueous workup the excess hexanediol was removed by kugelrohr distillation. The residue oil (18.2 g) was chromatographed on silica gel to give 17.6 g orange oil.

The orange oil (8.8 g) was treated with pentafluorobenzonitrile (6.36 g), triethyl amine (4.0 g) and acetone (40 mL) and heated to 72° C. for 3 hrs. Aqueous workup followed by extraction gave an oil that was purified by chromatography to give 4-[6-(3,5-dinitrobenzyloxy)-2,2,3,3,4,4,5,5-octafluorohexyloxy]-2,3,5,6-tetrafluorobenzonitrile (8.6 g).

The dinitro nitrile (3.1 g) was treated with tin chloride dihydrate (11.25 g) and ethanol (40 mL) and heated gradually to 80° C. for over 1.66 hr. Aqueous base workup followed by extraction gave an oil that was purified by chromatography and recrystallized from hexane-ethyl acetate to give diamine 13 (mp 82–83.5° C.).

EXAMPLE 20

To a solution of 2-(trifluoromethyl)-1,4-benzenediamine (79.2 mg), 4-(1H,1H-dihydroperfluorooctyloxy)benzeneamine (12.3 mg) and diamine 13 (13.9 mg) in γ-butyrolactone (0.72 g) was added 3,3',4,4'-benzophenonetetracarboxylic dianhydride (161.1 mg) at room temperature under a nitrogen atmosphere. The sidewall was rinsed with γ-butyrolactone (0.40 g) followed by stirring for 22.5 hr at room temperature. The mixture was diluted with γ-butyrolactone (5.26 g) before spinning optical alignment layers.

Substrates were coated and processed as described in Example 13. The results were the same as Example 13 except that the pretilt was measured to be approximately 1.5°.

EXAMPLE 21

A mixture of 3,3',4,4'-benzophenonetetracarboxylic dianhydride (6.44 g), 2,5-diaminobenzonitrile (2.46 g), diamine 1 (0.541 g), 4-(1H,1H-dihydroperfluorooctyloxy)benzeneamine (0.491 g) and γ-butyrolactone (40.0 g) was stirred at room temperature for 24 h under a nitrogen atmosphere. The solution was diluted to a 10 wt % solution with -butyrolactone (49.8 g) and filtered through a 0.45 micron teflon membrane filter. The solution was diluted to 5 wt % solution and spin coated as described in Example 1.

Substrates were coated, processed and exposed as described in Example 13. The results were the same as Example 13 except that the pre-tilt was measured to be approximately 0.2°. The uniformity of alignment with this formulation was better than that of Example 14.

We claim:

1. A polyamic acid composition which is the reaction product of an amine component and a tetracarboxylic dianhydride component which comprises at least one structural element of leach of the following formulas:

IV

V wherein $X_4$ is an electron withdrawing group having a positive σ, A is a trivalent organic moiety, P is a polar group comprising a Pi electron system containing at least one heteroatom selected from the group N, O, and S; and $L_f$ consists essentially of:

wherein —$(CF_2)_p$— is a straight chain or branched chain perfluoroalkyl radical, p is 4–20, X is selected from the group consisting of —$CH_2O$—, —$CH_2S$—, —$CH_2NR$—, —O—, —S—, —NR— and a covalent bond, wherein R is a $C_1$–$C_4$ hydrocarbon, n is up to 4; and M is a tetravalent organic radical derived from said tetracarboxylic dianhydride containing at least two carbon atoms, no more than two carbonyl groups of the dianhydride being attached to any one carbon atom of the tetravalent radical.

2. A polyamic acid composition of claim 1 wherein: $X_4$ is selected from the group —CN, —$CF_3$, F, Cl, Br, I, —$NO_2$, —$CO_2R_2$, and —$CON(R_2)_2$, wherein $R_2$ is H or a $C_1$–$C_4$ hydrocarbon: A is an aromatic ring selected from the group consisting of:

P is selected from the group of:

wherein $X_3$ is selected from the group —$N(R_2)_2$, —CN, —$NO_2$ and t is equal up to 4; within $L_p$, is selected from —$CH_2O$— and —O—, p is 4–12 and n is 1 to 3; and M is wherein $X_2$ is independently selected from the group H, Cl, F, Br, $R_1$, $R_1O$—, wherein $R_1$ s independently selected from $C_1$–$C_3$ perfluorinated alkyl chain, $C_1$–$C_3$ partially perfluorinated alkyl chain and $C_1$–$C_8$ hydrocarbon chain, m is 1 or 0, and Z is selected from the group —S—, —O—, —$SO_2$—, —$CH_2$—, —$C(CF_3)_2$—, —C(O)—, —$CH_2CH_2$—, —NR— and a covalent bond wherein R is a $C_1$–$C_4$ hydrocarbon chain; and the acid groups are ortho to the amide linkages.

3. A polyamic acid composition of claim 2 wherein $X_4$ is selected from the group —CN, —$CF_3$; and within M, $X_2$ is selected from H and Cl, and m is 0.

4. A polyamic acid composition of claim 3 wherein $X_2$ is H.

5. A polyimide derived from the polyamic acid of claim 1.

6. A polyimide derived from the polyamic acid of claim 1.

7. A liquid crystal display element made from a composition of a polyimide of claim 5.

8. A liquid crystal display element made from a composition of a polyimide of claim 6.

* * * * *